United States Patent
Wilson et al.

(10) Patent No.: US 10,530,527 B1
(45) Date of Patent: Jan. 7, 2020

(54) DISCRETE MULTI-TONE (DMT) SYSTEMS AND METHODS FOR MITIGATING INTERPOLATION ERRORS FROM CROSSTALK VECTORING

(71) Applicant: ADTRAN, INC., Huntsville, AL (US)

(72) Inventors: Arlynn Wayne Wilson, Huntsville, AL (US); Richard L. Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 16/041,387

(22) Filed: Jul. 20, 2018

(51) Int. Cl.
| | |
|---|---|
| *H04L 5/12* | (2006.01) |
| *H04L 1/00* | (2006.01) |
| *H04B 3/32* | (2006.01) |
| *H04L 25/03* | (2006.01) |
| *H04L 5/00* | (2006.01) |

(52) U.S. Cl.
CPC ............... *H04L 1/006* (2013.01); *H04B 3/32* (2013.01); *H04L 25/03006* (2013.01); *H04L 5/0007* (2013.01); *H04L 2025/03414* (2013.01)

(58) Field of Classification Search
CPC . H04L 1/006; H04L 25/03006; H04L 5/0007; H04L 2025/03414; H04B 3/32
USPC .......................................................... 375/265
See application file for complete search history.

(56) References Cited

U.S. PATENT DOCUMENTS

| | | | |
|---|---|---|---|
| 5,751,741 A * | 5/1998 | Voith .................... | H04B 7/2659 370/914 |
| 6,144,695 A * | 11/2000 | Helms ...................... | H04L 5/14 370/201 |
| 6,622,282 B2 | 9/2003 | Djokovic et al. | |
| 6,754,283 B1 | 6/2004 | Li | |
| 6,772,181 B1 * | 8/2004 | Fu ........................... | G06F 17/17 708/290 |
| 7,099,401 B2 * | 8/2006 | Betts ....................... | H04L 5/143 375/259 |
| 8,855,177 B1 | 10/2014 | Wilson et al. | |
| 9,083,785 B2 | 7/2015 | Goodson et al. | |
| 9,191,495 B2 | 11/2015 | Goodson et al. | |
| 2002/0136320 A1 * | 9/2002 | Jin ........................ | H04L 1/0043 375/265 |
| 2007/0053453 A1 | 3/2007 | Yeh et al. | |
| 2011/0110409 A1 * | 5/2011 | Sands ..................... | H04B 3/487 375/222 |
| 2012/0224683 A1 * | 9/2012 | Goodson .................. | H04B 3/32 379/406.06 |

(Continued)

*Primary Examiner* — Helene E Tayong
(74) *Attorney, Agent, or Firm* — Maynard Cooper & Gale, P.C.; Jon E. Holland

(57) ABSTRACT

In a vectored Discrete Multi-Tone (DMT) system that employs trellis encoding, tones of a DMT signal are paired by a trellis encoder, and parity information is shared between the paired tones. In accordance with some embodiments, the tones are paired based on an interpolation pattern that is used to calculate vectoring coefficients in an effort to mitigate interpolation error. Specifically, a tone having a vectoring coefficient with a relatively large interpolation error may be paired with a tone having a vectoring coefficient with a relatively small interpolation error thereby reducing the peak interpolation error among paired tones within the system. By reducing the peak interpolation error in the paired tones, the number of communication lines included in a vectoring group can be increased without significantly degrading signal quality.

13 Claims, 10 Drawing Sheets

(56) References Cited

U.S. PATENT DOCUMENTS

2013/0223550 A1* 8/2013 Fimoff ................ H04L 1/0045
375/261

\* cited by examiner

DISCRETE MULTI-TONE (DMT) SYSTEMS AND METHODS FOR MITIGATING INTERPOLATION ERRORS FROM CROSSTALK VECTORING

RELATED ART

Digital Subscriber Line (DSL) refers to data communication technologies that leverage the longstanding infrastructure of bundled twisted-pair copper wires that were originally deployed for analog telephone service as a way of delivering high-speed data communication. Enhancements to the earliest DSL technology have led to Asymmetric DSL (ADSL), Very High Bit-rate Digital Subscriber Line (VDSL), and VDSL2, among others. The VDSL2 protocol is set forth in the International Telecommunications Union (ITU) standard G.993.2. VDSL2 employs Discrete Multi-Tone (DMT) modulation, which is a form of orthogonal frequency division multiplexing (OFDM). In DMT modulation, the frequency band of a data channel is divided into multiple (e.g., up to several thousand) mutually orthogonal carrier frequencies, also referred to as "tones." Since adjacent tones are mutually orthogonal, there is very little or no interference between them. However, there may be interference, i.e., crosstalk, between different signals occurring on neighboring wire pairs in a cable bundle.

In an effort to mitigate the effects of crosstalk, vectoring is often employed for the tones of DMT signals communicated across a group of subscriber lines, referred to in this context as a "vectoring group." In such a vectored DMT system, DMT symbols of interfering tones (referred to herein as "disturbers") are combined with vectoring coefficients in order to estimate the amount of crosstalk affecting a symbol of a victim tone so that crosstalk induced by the disturbers of the victim tone can be canceled from the victim tone. In such manner, crosstalk can be canceled tone-by-tone for all of the tones of the vectoring group.

The vectoring coefficients must be updated to account for changing coupling conditions within the vectoring group, and the process of calculating vectoring coefficients is complex and processing intensive. To help reduce complexity and increase the number of subscriber lines that can be included in a vectoring group, interpolation is often used to estimate some of the vectoring coefficients. In particular, the vectoring coefficients (referred to hereafter as "calculated vectoring coefficients") for a subset of the tones of a vectoring group are precisely calculated, and the vectoring coefficients (referred to hereafter as "interpolated vectoring coefficients") for the remaining tones of the vectoring group are interpolated using the calculated vectoring coefficients. As an example, vectoring coefficients may be precisely calculated for every $x^{th}$ tone (where x can be any positive integer, such as 8 or 32), and the vectoring coefficients for tones in between may be estimated via interpolation. In this example, x is generally referred to as the "interpolation factor."

As used herein, a tone for which its vectoring coefficients are estimated by interpolation shall be referred to herein as an "interpolated tone," whereas a tone for which its vectoring coefficients are precisely calculated (e.g., without the use of interpolation) shall be referred to herein as a "calculated tone." Further, the interpolation factor generally indicates the ratio of interpolated tones to calculated tones such that a higher interpolation factors means that a greater overall number of tones are interpolated.

For a given set of processing resources, increasing the interpolation factor generally enables a larger vectoring group so that crosstalk can be canceled from more tones. However, each interpolated vectoring coefficient has at least some error resulting from the interpolation, and increasing the interpolation factor has the effect of also increasing interpolation error. Thus, a trade-off exists between increasing the interpolation factor and signal quality. Specifically, in order to keep the Signal-to-Noise Ratio (SNR) of the DMT signals within a desired range, there is a practical upper limit to the interpolation factor and, hence, the number of subscriber lines that can be included in a vectoring group.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
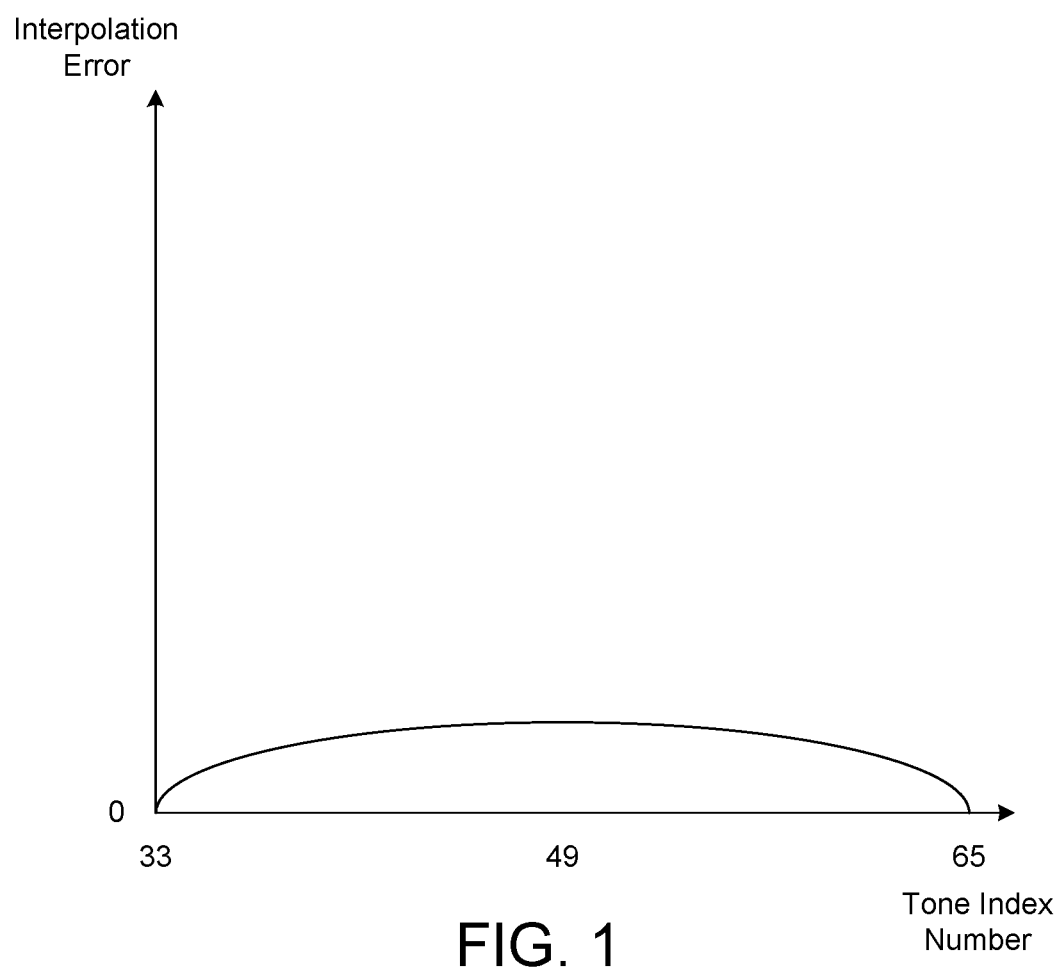
FIG. 1 is a graph illustrating exemplary interpolation error across a number of tones.

The present disclosure generally pertains to Discrete Multi-Tone (DMT) systems and methods that mitigate interpolation errors from crosstalk vectoring. In a vectored DMT system, the interpolation error for an interpolated coefficient of a given tone is generally greater the further that the tone is from the closest endpoint of its respective interpolation range. As an example, assume an interpolation factor of 32 such that the vectoring coefficients of each $32^{nd}$ tone are calculated and the vectoring coefficients of the tones in between are interpolated. As an example, assume that the vectoring coefficients for tone 33 and tone 65 (referred to in this example as the "end tones") are calculated and, therefore, have no interpolation error. The vectoring coefficients for the tones 34-64 in between the end tones 33 and 65 are interpolated based on the calculated vectoring coefficients for such end tones 33 and 65. The interpolated coefficients for tones (e.g., tone 49) near the midpoint of the interpolation range between tone 33 and tone 65 generally have the greatest interpolation error while the interpolated coefficients for the tones (e.g., tones 34 and 64) close to the end tones 33 and 65 generally have the least interpolation error, as shown by FIG. 1. In this regard, interpolation error generally increases the further (in frequency) an interpolated tone is from the calculated end tones used to interpolate its vectoring coefficients.

Note that the tone numbers described above and shown in FIG. 1 are referred to as "tone indices" or "tone index numbers." As known in the art, according to applicable standards, each tone is assigned a tone index to identify the tone relative to other tones of the DMT signal. Generally, the tone indices are assigned according to frequency such that frequency generally increases with the indices and adjacent tones are assigned consecutive indices. As an example, tone 33 may have the lowest frequency band in the range of tones 33-65 shown by FIG. 1, tone 34 may have the next highest frequency band after tone 33 in such range, tone 2 may have the next highest frequency band after tone 34 in such range, and so on.

In a trellis encoding system, tones of a DMT signal are paired, and parity information is shared between the paired tones. As an example, the data bits for a pair of tones may be combined by a trellis encoder, which may then calculate at least one parity bit for the combined data bits and append the parity bit(s) to the combined data bits for use in correcting errors in the combined data bits at the receiver. For simplicity, adjacent tones are often paired by conventional encoders. However, in accordance with the present disclosure, the tones may instead be paired based on the interpolation pattern that is used for the vectoring coefficients in an effort to mitigate interpolation error. Specifically, a tone associated with vectoring coefficients having a relatively large interpolation error may be paired with a tone associated with vectoring coefficients having a relatively small interpolation error thereby reducing the peak interpolation error among paired tones within the system. The foregoing can be achieved by ensuring that an interpolated tone relatively close to one of its calculated end tones (i.e., a tone having a calculated vectoring coefficient) is paired with another tone that is relatively far from either of its calculated end tones, as will be described in more detail below.

Figure 2:
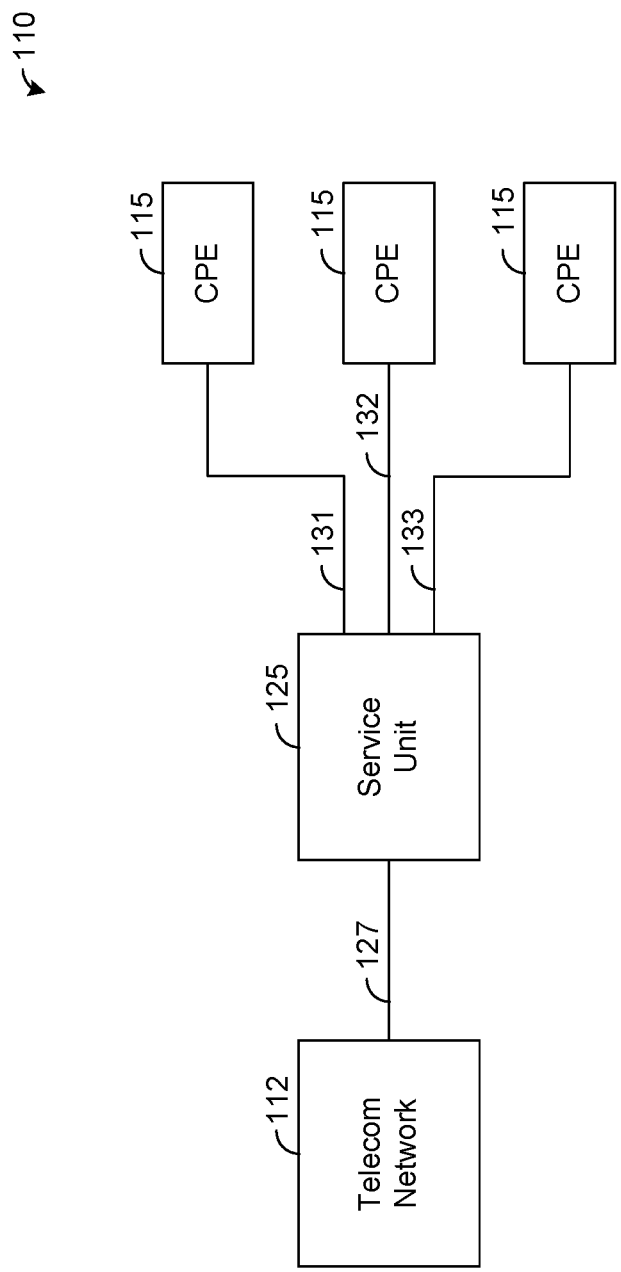
FIG. 2 is a block diagram illustrating an exemplary embodiment of a communication system.

FIG. 2 depicts an exemplary embodiment of a communication system 110. As shown by FIG. 2, the system 110 comprises a telecommunication network 112 configured to communicate with customer premises equipment (CPE) 115, which may comprise one or more customer premises (CP) transceivers (not shown in FIG. 1). In this regard, the network 112 may be coupled to a service unit (SU) 125 at a distribution point or other intermediate point between the network 112 and the CPE 115. The service unit 125 may be coupled to the network 112 via at least one network line 127 and to the CPE 115 via a plurality of communication lines 131-133, such as twisted-wire pairs, sometimes referred to as "subscriber lines." In some embodiments, the network line 127 comprises at least one optical fiber, but other types of network lines, such as one or more twisted-wire pairs, may be used in other embodiments. For simplicity of illustration, FIG. 2 depicts three subscriber lines 131-133, but there can be any number of subscriber lines 131-133 in other embodiments.

In a downstream direction, the service unit 125 receives at least one high-speed data stream from the network 112 via the network line 127 and transmits packets from the high-speed data stream across the plurality of subscriber lines 131-133. In an upstream direction, the service unit 125 receives data streams from the CPE 115 via the subscriber lines 131-133 and transmits packets from such data streams across the network line 127 to the network 112.

In some embodiments, each subscriber line 131-133 comprises at least one twisted-wire pair, and digital subscriber line (DSL) modulation formats are used to communicate data across the subscriber lines 131-133. According to such formats, DMT signals may be communicated across the subscriber line 131-133. As an example, the service unit 125 may be configured to communicate according to ADSL or VDSL2, which utilize DMT signals, but it should be emphasized that other types of modulation formats and protocols may be used in other embodiments. Unless otherwise indicated herein, it will be assumed hereafter that DMT signals, such as signals in accordance with VDSL2, are communicated across each subscriber line 131-133 in both the upstream and downstream directions.

Figure 3:
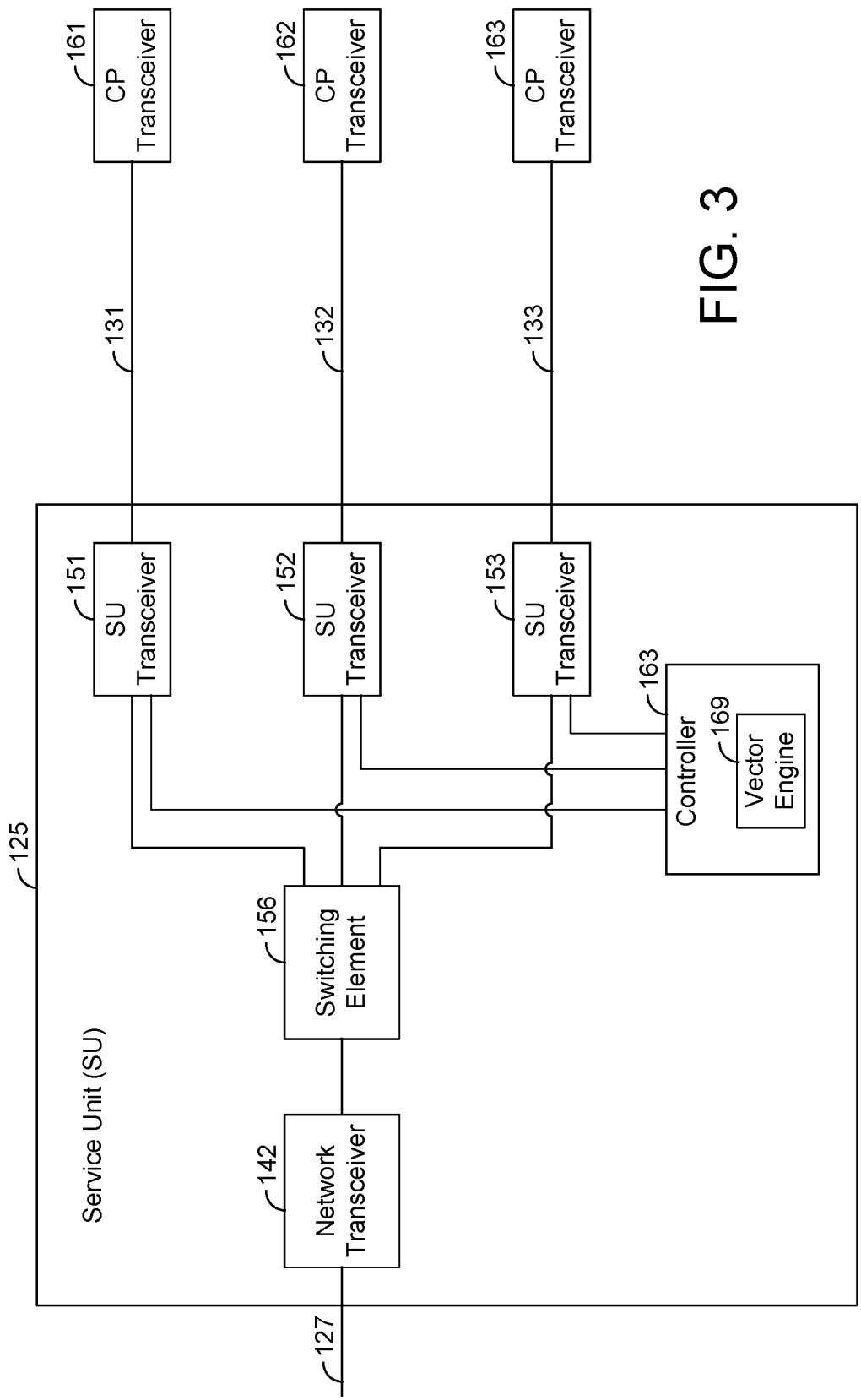
FIG. 3 is a block diagram illustrating an exemplary embodiment of a service unit, such as is depicted by FIG. 2, coupled to a plurality of customer premises (CP) transceivers.

FIG. 3 depicts an exemplary embodiment of the service unit (SU) 125. As shown by FIG. 3, the service unit 125 comprises a network transceiver 142 that is coupled to the network line 127 and a plurality of SU transceivers 151-153 that are respectively coupled to a plurality of customer premises (CP) transceivers 161-163 by the subscriber lines 131-133.

As shown by FIG. 3, a switching element 156 is coupled between the network interface 142 and the SU transceivers 151-153. The switching element 156 may be implemented in hardware or a combination of hardware and software. In one exemplary embodiment, the switching element 156 is implemented as a field-programmable gate array, but other types of switching elements 156 are possible in other embodiments.

In the downstream direction, the network transceiver 142 receives data packets from the network line 127 and transmits such data packets to the switching element 156, which is configured to forward the data packets to the SU transceivers 151-153 for transmission across the subscriber lines 131-133 based on header information within the data packets using forwarding techniques known in the art. When an SU transceiver 151-153 receives data packets from the switching element 156, the SU transceiver modulates a carrier signal with the data packets to form a data signal that is transmitted across the transceiver's respective subscriber line 131-133.

In the upstream direction, the SU transceivers 151-153 receive modulated data signals from the subscriber lines 131-133. For a given signal received by a given SU transceiver 151-153, the SU transceiver demodulates the received signal to recover data packets. The SU transceiver forwards the data packets to the switching element 156, and the switching element 156 combines the data packets received from all of the SU transceivers 151-153 into a high-speed data stream, which is received by the network transceiver 142 for transmission across the network line 127.

As shown by FIG. 3, each SU transceiver 151-153 is coupled to at least one controller 163 that is configured to perform various functions, as will be described in more detail below. The controller 163 may be implemented as a combination of hardware and software, such as at least one microprocessor or other type of processor programmed with instructions for performing various functions. Other configurations of the controller 163 are possible in other embodiments. As an example, the controller 163 may be implemented as a field programmable gate array (FPGA) or other type hardware as may be desired.

Figure 4:
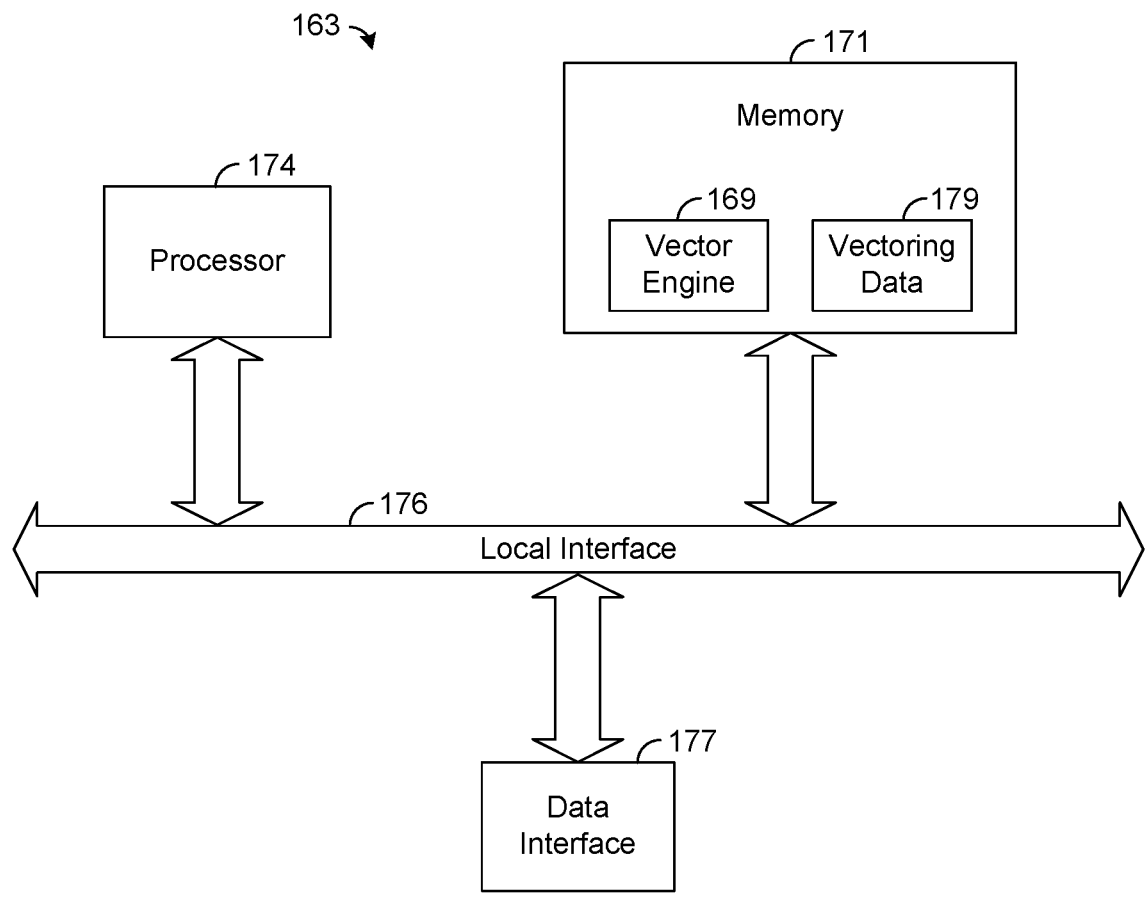
FIG. 4 is a block diagram illustrating an exemplary embodiment of a controller at a service unit, such as is depicted by FIG. 3.

FIG. 4 depicts an exemplary embodiment of the controller 163. As shown by FIG. 4, the controller 163 may comprise a vector engine 169 for performing crosstalk vectoring in order to cancel far-end crosstalk (FEXT) that couples from one subscriber line 131-133 to another, as will be described in more detail below. The vector engine 169 can be implemented in software, hardware, firmware or any combination thereof. In the exemplary controller 163 illustrated by FIG. 4, the vector engine 169 is implemented in software and stored in memory 171 of the controller 163.

The exemplary controller 163 depicted by FIG. 4 comprises at least one conventional processor 174, such as a digital signal processor (DSP) or a central processing unit (CPU), that communicates to and drives the other elements within the controller 163 via a local interface 176, which can include at least one bus. Furthermore, a data interface 177 permits the controller 163 to receive data from or communicate data to other components of the service unit 125 as may be desired.

As indicated above, the vector engine 169 is configured to cancel FEXT that couples from one subscriber line 131-133 to another. In some embodiments, the vector engine 169 generates and maintains vectoring data 179, which is stored in memory 171, for use in performing crosstalk vectoring. When DMT signals are used, the vectoring data 179 may include vectoring coefficients for the tones transmitted and received by the SU transceivers 151-153. Via known techniques, the vector engine 169 may use such vectoring data 179 to estimate crosstalk that affects the received tones or that will affect tones to be transmitted so that the crosstalk can be cancelled.

For example, the vectoring data 179 may include sets of vectoring coefficients respectively corresponding to the tones communicated across the subscriber lines 131-133. For a given tone, referred to in this example as "victim tone," received by one of the SU transceivers 151-153 from one of the subscriber lines 131-133, the corresponding set of vectoring coefficients includes vectoring coefficients respectively associated with the tones, referred to as "disturbers," that interfere with the victim tone. Upon receiving a set of DMT symbols simultaneously communicated across the subscriber lines 131-133, the transceivers 151-153 send such symbols to the controller 163. For each victim tone, the vector engine 169 accesses the set of vectoring coefficients corresponding to the victim tone. For each disturber of the victim tone, the vector engine then combines (e.g., multiplies) the symbol of the disturber with the vectoring coefficient that is associated with such disturber and then combines (e.g., adds or subtracts depending on sign convention) this result with the victim tone in order to cancel the crosstalk interference from the disturber affecting the victim tone. The vector engine 169 performs the same process for each of the other disturbers in order to cancel, tone-by-tone, crosstalk interference in the victim tone.

The vector engine 169 may use the same techniques to cancel crosstalk from any victim tone received from any subscriber line 131-133 within the same vectoring group. As known in art, a "vectoring group" generally refers to a group of subscriber lines for which a vector engine maintains vectoring coefficients so that crosstalk from disturbers communicated by the vectoring group can be cancelled. For illustrative purposes, assume that each of the subscriber lines 131-133 are within the same vectoring group so that the vector engine 169 is capable of cancelling crosstalk that couples from any of the subscriber lines 131-133 to any of the other subscriber lines 131-133.

Note that the vector engine 169 may use techniques similar to those described above in order to precode the symbols transmitted by the SU transceivers 151-153 across the subscriber lines 131-133 such that crosstalk is cancelled as the symbols propagate across the subscriber lines 131-133. Exemplary techniques for performing crosstalk vectoring, including symbol precoding, are described in commonly-assigned U.S. Pat. No. 8,582,425, entitled "Systems and Methods for Cancelling Crosstalk in Satellite Access Devices" and filed on Jan. 28, 2011, which is incorporated herein by reference.

Figure 5:
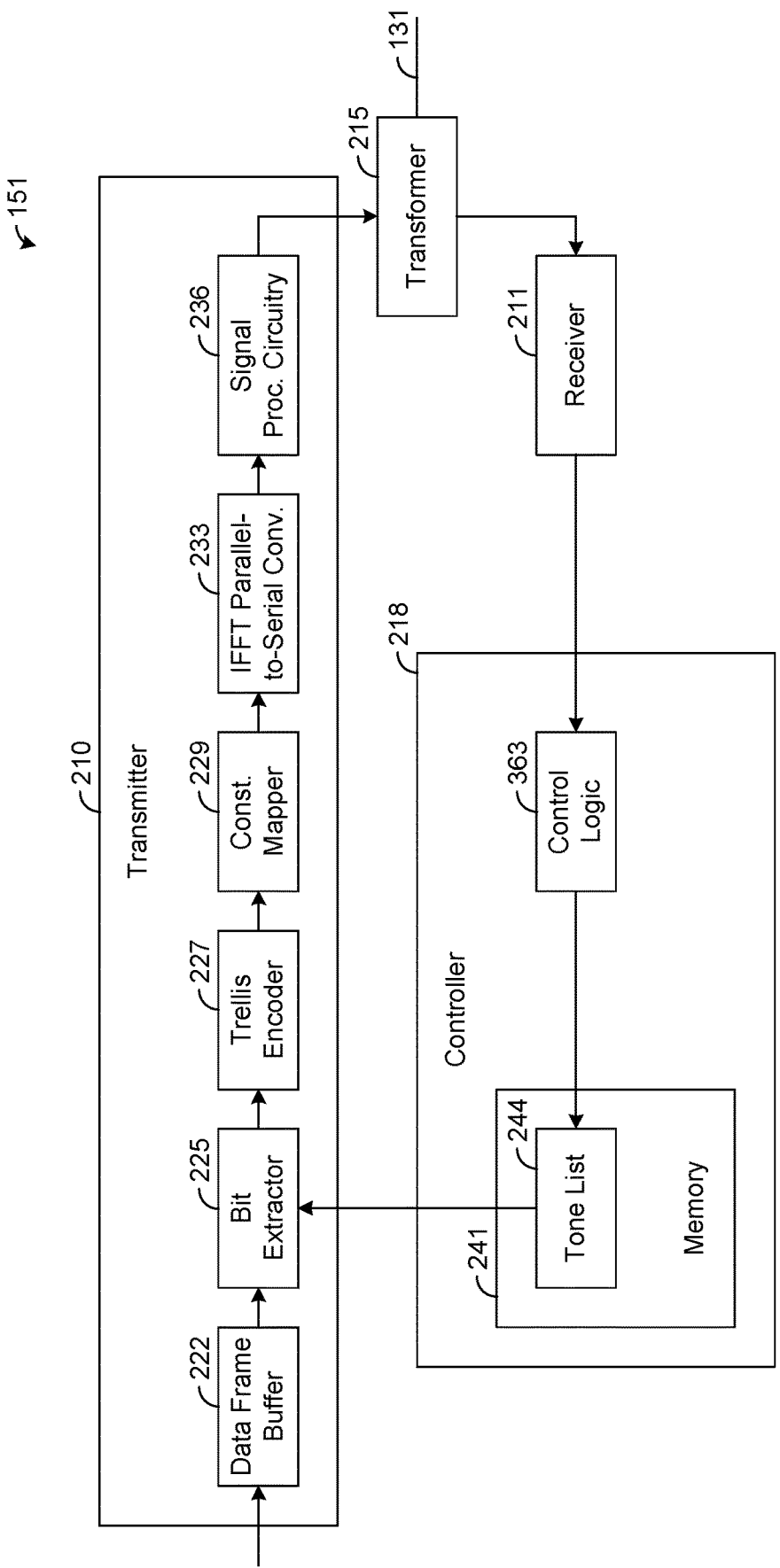
FIG. 5 a block diagram illustrating an exemplary embodiment of a service unit (SU) transceiver, such as is depicted by FIG. 3.

FIG. 5 depicts an exemplary embodiment of an SU transceiver 151, which will be described in more detail below. Note that the other SU transceivers 152 and 153 may configured similar or identical to the SU transceiver 151 described below.

The transceiver 151 comprises a transmitter 210 and a receiver 211 that are coupled to a subscriber line 131 through a transformer 215. The transceiver 151 also includes a controller 218 that is configured to control operations in the transceiver 151, as will be described in more detail hereafter. As shown by FIG. 5, the transmitter 210 includes a data frame buffer 222, a bit extractor 225, a trellis encoder 227, a constellation mapper 229, an inverse fast-Fourier transform (IFFT) parallel-to-serial converter 233, and signal processing circuitry 236. The transceiver 200 also has memory 241 for storing a tone list 244. In addition to the foregoing elements, other elements commonly included in conventional transceivers, such as VDSL2 transceivers, as known to one of ordinary skill in the art may be included in the transceiver 151 but are not shown for simplicity of illustration.

The data frame buffer 222 is configured to store data from the switching element 156 (FIG. 3) to be transmitted to a CP transceiver 161 (FIG. 3) across the subscriber line 131 that is coupled to the transformer 215. The data in the buffer 222 may define frames of data to be transmitted across the subscriber line 131 where each frame includes the bits of each tone to be encoded for transmission by the trellis encoder 227. For each tone, the bit extractor 225 is configured to extract the data bits to be carried by the tone and to forward the data bits to the trellis encoder 227. Further, the tone list 244 specifies which tones are to be paired by the trellis encoder 227, and the bit extractor 225 uses the tone list 244 to control which tones are so paired. In this regard, for each pair of tones indicated by the list 244, the bit extractor 225 extracts a first group of data bits for one of the tones of the pair and a second group of data bits for the other tone of the pair and provides the first and second groups of data bits to the trellis encoder 227 simultaneously, thereby indicating to the trellis encoder 227 that the first and second groups of data bits are to be combined. The bit extractor may also provide the tone index for each tone of the pair as indicated by the tone list 244. In other embodiments, other techniques may be used for indicating which tones are to be paired.

Upon receiving the first and second groups data bits for a tone pair, the trellis encoder 227 encodes the first and second groups of data bits into a coded tone group, which includes the data information defined by the data bits of both tones received from bit extractor 225 and parity information based on such data bits. As an example, the parity information may include at least one parity bit that is based on the data bits for both tones so that the parity information can be used to correct errors in either of the paired tones at the CP transceiver 161. The coded tone group may be a combination of the data bits from each of the paired tones with parity information appended as is known in the art. The trellis encoder 227 may similarly form a coded tone group for each pair of tones of the downstream DMT signal.

The constellation mapper 229 is configured to receive the coded tone groups formed by the trellis encoder 227 and to map the coded tone groups to Quadrature Amplitude Modulation (QAM) points. The IFFT serial-to-parallel converter 233 is configured to convert the parallel-format data that is output by the constellation mapper 229 to a serial data format to produce a DMT symbol that is modulated for transmission across the subscriber line 231. In this way, the transmitter 210 may transmit a stream of DMT symbols across the subscriber line 131 according to a desired DSL modulation format, such as VDSL2.

The signal processing circuitry 236 may perform various known signal processing techniques, such as amplification, for processing the DMT symbols for transmission across the subscriber line 131 coupled to the transformer 215. In addition, before transmitting a DMT symbol, the signal processing circuitry may combine crosstalk estimates from the vector engine 169 with the DMT symbol in order to precode the symbol for crosstalk cancellation, as described above.

Figure 6:
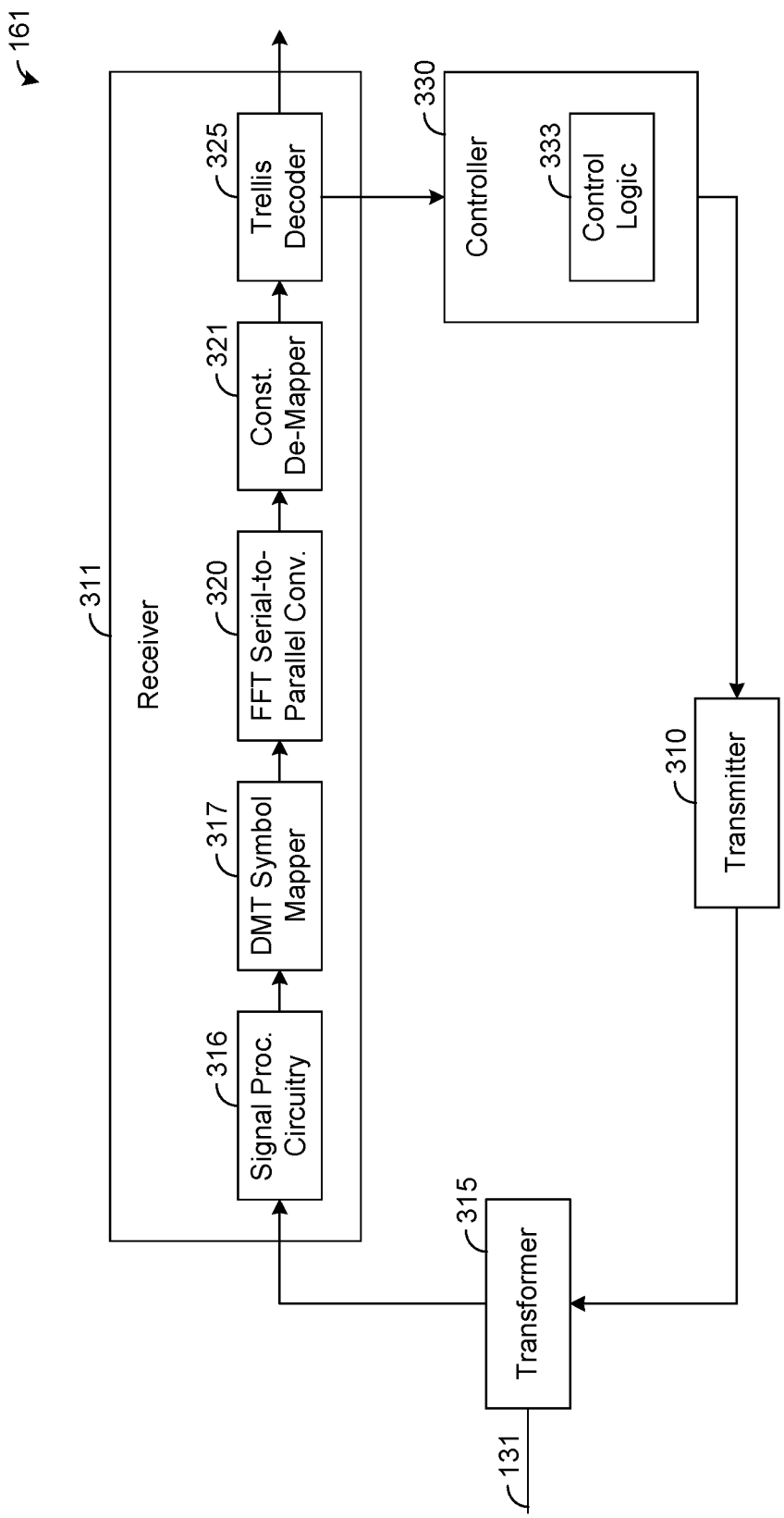
FIG. 6 is a block diagram illustrating an exemplary embodiment of a CP transceiver, such as is depicted by FIG. 3.

FIG. 6 depicts an exemplary embodiment of a CP transceiver 161 that may be coupled to the subscriber line 131 and configured to communicate with the SU transceiver 151 of FIG. 5. Note that the other CP transceivers 162 and 163 may be configured similar or identical to the CP transceiver 161 for communicating with the SU transceivers 152 and 153, respectively.

The transceiver 161 comprises a transmitter 310 and a receiver 311 that are coupled to a subscriber line 131 through a transformer 315. The configuration of the transmitter 310 of FIG. 6 may be identical or similar to the transmitter 210 of the SU transceiver 151 depicted by FIG. 5 in order to provide an upstream DMT signal for transmission to the SU transceiver 151. As shown by FIG. 6, the receiver 311 includes signal processing circuitry 316, a DMT symbol sampler 317, a fast-Fourier transform (FFT) serial-to-parallel converter 320, a constellation de-mapper 321, and a trellis decoder 325. In addition to the foregoing elements, other elements commonly included in conventional transceivers, such as VDSL2 transceivers, as known to one of ordinary skill in the art may be included in the transceiver 161 but are not shown for simplicity of illustration.

The signal processing circuitry 316 receives the downstream DMT signal communicated across the subscriber line 131 that is coupled to the transformer 315. The signal processing circuitry 316 processes the downstream DMT signal according to the signal's modulation format and other factors. Specifically, the circuitry 316 may be configured to perform signal processing functions, such as analog-to-digital conversion, filtering, equalization, and other known signal processing techniques.

The DMT symbol sampler 317 is configured to provide each received DMT symbol to the FFT serial-to-parallel converter 320, which is configured to convert the received DMT symbol from a serial data format to a parallel data format using a fast-Fourier transform. The parallel-format data that is output by the FFT serial-to-parallel converter 320 is provided to the constellation de-mapper 321, which is configured to de-map the parallel-format data from QAM points.

The trellis decoder 325 decodes the data from the constellation de-mapper 321 in order to correct for errors that may be present in the data. In this regard, the trellis decoder 325 uses the parity information encoded by the trellis encoder 227 (FIG. 5) in order to locate and correct erroneous data bits in the received data.

As shown by FIG. 6, the trellis decoder 325 is coupled to at least one controller 330 that is configured to perform various functions, as will be described in more detail below. The controller 330 may be implemented as a combination of hardware and software, such as at least one microprocessor or other type of processor programmed with instructions for performing various functions. Other configurations of the controller 330 are possible in other embodiments. As an example, the controller 330 may be implemented as a field programmable gate array (FPGA) or other type hardware as may be desired.

Figure 7:
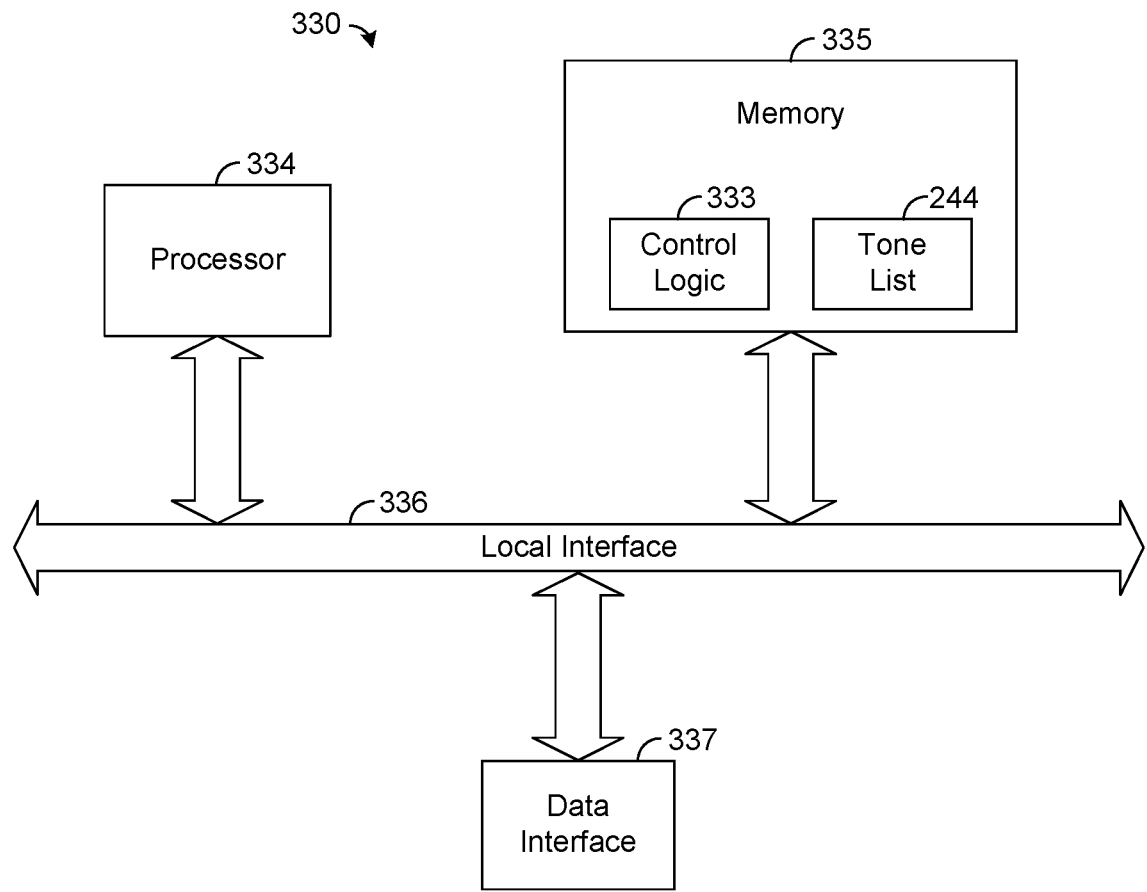
FIG. 7 is a block diagram illustrating an exemplary controller at a CP transceiver, such as is depicted by FIG. 6.

FIG. 7 depicts an exemplary embodiment of the controller 330. As shown by FIG. 7, the controller 330 may comprise control logic 333 for performing various functions, as will be described in more detail below. The control logic 333 can be implemented in software, hardware, firmware or any combination thereof. In the exemplary controller 330 illustrated by FIG. 7, the control logic 333 is implemented in software and stored in memory 335 of the controller 330.

The exemplary controller 330 depicted by FIG. 7 comprises at least one conventional processor 334, such as a digital signal processor (DSP) or a central processing unit (CPU), that communicates to and drives the other elements within the controller 330 via a local interface 336, which can include at least one bus. As an example, the processor 334 may execute instructions of the control logic 333 for performing functions of such control logic 333 when it is implemented in software. Furthermore, a data interface 337 permits the controller 330 to receive data from or communicate data to other components of the transceiver 300 as may be desired.

The control logic 333 is configured to communicate control information with the SU transceiver 151 (FIG. 3) related to the communication occurring across the subscriber line 131. As an example, the control logic 333 may communicate such control information using an embedded control channel of the subscriber line 131, such as the Embedded Operations Channel (EOC) defined for VDSL2 communications when the transceivers 151 and 161 communicate with each other according to VDSL 2. In other embodiments, other channels may be used to communicate control information between the transceivers 151 and 161.

Some of the control information may pertain to the tone list 244 stored at the SU transceiver 151. In this regard, according to applicable standards and practice, a receiver often specifies tone ordering by generating the tone list and sending the tone list to the transmitter, which uses such tone list to control the ordering of tones and, hence, the pairing of tones processed by the transmitter's encoder. Consistent with this practice, the control logic 333 at the CP transceiver 161 may be configured to generate the tone list 244 and send the tone list 244 to the SU transceiver 151 using an embedded control channel. As will be described in more detail below, the control logic 333 generates or otherwise defines or provides the tone list 244 based on the vectoring interpolation pattern used by the vector engine 169 (FIG. 4) in order to mitigate interpolation error from the vectoring performed by the vector engine 169.

Figure 8:
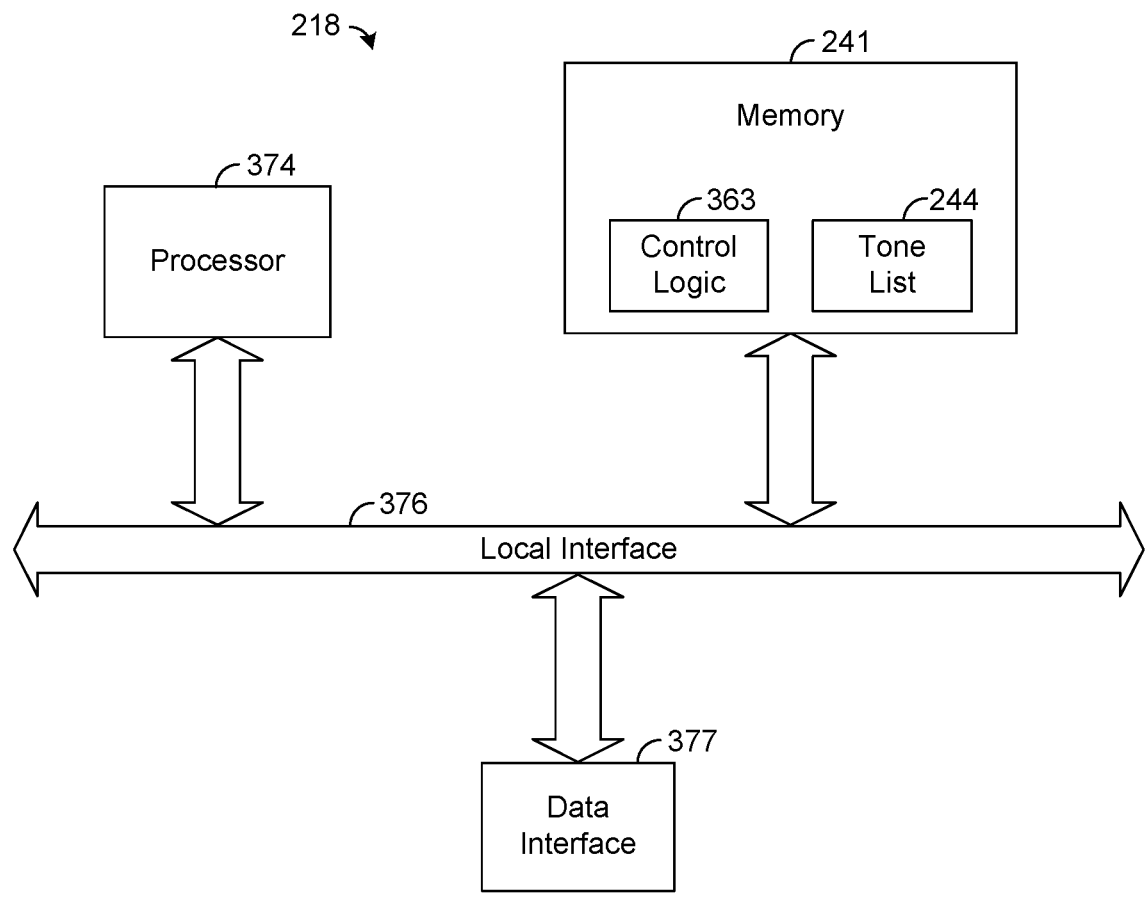
FIG. 8 is a block diagram illustrating an exemplary embodiment of a controller at a service unit (SU) transceiver, such as is depicted by FIG. 5.

Referring to FIG. 5, when the tone list 244 is transmitted, it is received at the receiver 211 of the SU transceiver 151 and processed by the controller 218. FIG. 8 depicts an exemplary embodiment of the controller 218. As shown by FIG. 8, the controller 218 may comprise control logic 363 for performing various functions, as will be described in more detail below. The control logic 363 can be implemented in software, hardware, firmware or any combination thereof. In the exemplary controller 218 illustrated by FIG.

8, the control logic 363 is implemented in software and stored in the memory 241 of the controller 163.

The exemplary controller 218 depicted by FIG. 8 comprises at least one conventional processor 374, such as a digital signal processor (DSP) or a central processing unit (CPU), that communicates to and drives the other elements within the controller 218 via a local interface 376, which can include at least one bus. As an example, the processor 218 may execute instructions of the control logic 363 for performing functions of such control logic 363 when it is implemented in software. Furthermore, a data interface 377 permits the controller 218 to receive data from or communicate data to other components of the transceiver 151 as may be desired.

When the control logic 363 receives the tone list 244 from the CP transceiver 161, it stores the tone list 244 in memory 241 and uses the tone list 244 to control the bit extractor 225 and specifically which tones are paired by the trellis encoder 227, as described above. In this manner, the control logic 333 at the CP transceiver 161 effectively may control which tones are paired by the trellis encoder 227 at the SU transceiver 151. In other embodiments, other techniques for controlling tone pairing by the trellis encoder 227 are possible.

Note that there are other types of control information that may be communicated by the transceivers 151 and 161. As an example, vectoring information may be sent through the embedded control channel, layer 2 data packets or otherwise from the CP transceiver 161 to the SU transceiver 151 so that the vectoring coefficients used by the vector engine 169 (FIG. 4) may be updated to account for changing line conditions. In this regard, the trellis decoder 325 of FIG. 6 may provide feedback indicative of the errors detected by the decoder 325, such as the amount of error detected per tone for each DMT symbol received by the decoder 325. The control logic 333 at the CP transceiver 161 may be configured to transmit such error feedback to the SU transceiver 151, and the control logic 363 at the SU transceiver 151 may provide this error feedback to the vector engine 169 (FIG. 4), which may use such feedback to update the vectoring coefficients. As an example, the vector engine 169 may use a Least Mean Squares (LMS) algorithm or some other algorithm as may be desired to update the vectoring coefficients in an effort to drive the decoder error to zero over time, as is known in the art.

Note that, as indicated above, the vector engine 169 may be configured to interpolate vectoring coefficients according to an interpolation pattern. For example, as described above, the vector engine 169 may precisely calculate the vectoring coefficients for every $x^{th}$ tone and use such calculated vectoring coefficients to interpolate the vectoring coefficients for the remaining tones. Such interpolation not only reduces memory requirements and the processing burdens for the vector engine 169, but it also may reduce the amount of control information that is communicated between the transceivers 151 and 161. In this regard, the control logic 333 at the CP transceiver 161 may be configured to provide error feedback only for the calculated tones and refrain from sending error feedback for the interpolated tones. In any event, only the calculated vectoring coefficients are updated directly from the error feedback received from the CP transceiver 161. The other vectoring coefficients (i.e., the "interpolated vectoring coefficients") are interpolated from the calculated vectoring coefficients, and there is no need, therefore, to send error feedback for the tones associated with interpolated vectoring coefficients.

In order for the control logic 333 at the CP transceiver 161 to provide error feedback and control tone pairing according to the exemplary techniques described herein, it is preferable for such control logic 333 to have knowledge of the interpolation pattern used by the vector engine 169 at the SU 125. There are various techniques that can be used to inform the control logic 333 of the interpolation pattern. In one embodiment, the CP transceiver 161 may be provisioned with data indicative of such interpolation pattern, and the control logic 333 may use such data to determine which of the tones are associated with interpolated vectoring coefficients and which of the tones are associated with calculated vectoring coefficients. In another embodiment, the control logic 333 may be otherwise preprogrammed with such information. In yet another embodiment, the information may be communicated from the SU transceiver 151 to the CP transceiver 161.

As an example, the control logic 363 at the SU transceiver 151 may communicate with the vector engine 169 to learn which of the vectoring coefficients are to be interpolated and which are to be precisely calculated according to the design of the vector engine 169. The control logic 363 may then transmit control data indicative of such information to the CP transceiver 161. For example, the control logic 363 may send the tone indices of the tones associated with calculated vectoring coefficients or tones associated with interpolated vectoring coefficients so that the control logic 333 is aware of the interpolation pattern. In another example, the control logic 363 may transmit a value indicative of the interpolation factor, and the control logic 333 at the CP transceiver 161 may use the interpolation factor to identify which tones are associated with calculated vectoring coefficients and which tones are associated with interpolated vectoring coefficients. In other embodiments, yet other techniques of informing the control logic 333 at the CP transceiver 161 of the interpolation pattern are possible.

As indicated above, the control logic 333 at the CP transceiver 161 is configured to use the interpolation pattern in order to determine which tones should be paired by the trellis encoder 227 (FIG. 5) at the SU transceiver 151. Specifically, based on the interpolation pattern, the control logic 333 is configured to indicate that tones associated with a relatively small amount of interpolation error for vectoring are to be paired with tones associated with a relatively large amount of interpolation error so that the peak interpolation error for each pair is limited.

There are various algorithms that may be used to pair tones to mitigate interpolation error. In some embodiments, the control logic 333 is configured to identify a tone having the greatest interpolation error for vectoring and a tone having the least interpolation error for vectoring and to then select these two tones for pairing. The control logic 333 then analyzes the remaining tones that have yet to be selected for pairing and again selects for pairing the two tones associated with the greatest and least interpolation errors. The control logic 333 may continue selecting tones for pairing in this manner until all possible tone pairs have been selected. Accordingly, the tones having relatively high interpolation error should be paired with tones having relatively low interpolation error such that the peak interpolation error for each tone pair should be about the same (and relatively low compared to embodiments where tones having relatively high interpolation errors are paired together).

In some embodiments, tones may be paired according to the following equation.

(tone index $I$–tone index $J$)mod(interpolation factor)
=(interpolation factor)/2     (1)

where "tone index I" refers to the tone index of a first tone to be paired and "tone index J" is the tone index of a second tone to be paired. That is, the control logic 333 may use Equation (1) to find tones suitable for pairing by only pairing tones that satisfy this equation. The control logic 333 may use Equation (1) to continually find pairs until all possible pairs have been identified. As an example, for an interpolation factor of 32, tone 33 may be paired with tone 49, tone 34 may be paired with tone 50, tone 35 may be paired with tone 51, tone 36 may be paired with tone 52, and so forth. Alternatively, tone 33 may be paired with tone 80, tone 34 may be paired with tone 81, tone 35 may be paired with tone 82, tone 36 may be paired with tone 83, and so forth. Also, the spacing may be randomized within the constraints of the above equation. For example, tone 34 may be paired with tone 81, and tone 35 may be paired with tone 51.

To further illustrate principles of the present disclosure, an exemplary algorithm for determining tone pairing will now be described in more detail below with particular reference to FIG. 9. In this regard, based on the interpolation pattern implemented by the vector engine 169 (FIG. 4), the control logic 333 of the CP transceiver 161 is configured to select a tone that is associated with a vectoring coefficient having the greatest amount of interpolation error, as shown by block 410. In some embodiments, this can be achieved by selecting an interpolated tone that is the farthest (in frequency) from the nearest calculated tone used to interpolate its vectoring coefficient.

As an example, assume that the interpolation pattern used by the vector engine 169 has an interpolation factor of 32, such that the vectoring coefficient of every 32 tones is precisely calculated based on error feedback from the trellis decoder 325. Further assume for simplicity of illustration that there are 65 tones (e.g., tones 33-97) where (1) the vectoring coefficients of tones 33, 65, and 97 are precisely calculated, (2) the vectoring coefficients of tones 34-64 are interpolated based on the vectoring coefficients of tones 33 and 65, and (3) the vectoring coefficients of tones 66-96 are interpolated based on the vectoring coefficients of tones 65 and 97. In such example, tones 49 and 81 may be associated with the greatest interpolation error since each such tone is separated (in frequency) from its nearest calculated tone by the greatest amount (which is the same for both tones 49 and 81) relative to the other interpolated tones. That is, the separation (in frequency) between tones 33 and 49 or between tones 49 and 65 is the same as the separation (in frequency) between tones 65 and 81 or between tones 81 and 97. Further, such separation is greater than the separation (in frequency) between any of the other interpolated tones and their respective nearest calculated tone. Since these tones 49 and 81 are the farthest from their respective calculated tones, they should be associated with the greatest amount of interpolation error.

When multiple tones are identified as having the greatest interpolation error in block 410, the control logic 333 may be configured to select any one of such tones in block 412 (e.g., randomly or according to any desired algorithm). For illustrative purposes, assume that the control logic 333 selects tone 49 in block 410.

Based on the interpolation pattern implemented by the vector engine 169 (FIG. 4), the control logic 333 of the CP transceiver 161 is configured to select a tone that is associated with a vectoring coefficient having the least amount of interpolation error, as shown by block 412. In some embodiments, this can be achieved by selecting a calculated tone (which has no interpolation error), if such a calculated tone has yet to be paired, or an interpolated tone that is the closest (in frequency) to the nearest calculated tone used to interpolate its vectoring coefficient.

In the above example in which an interpolation factor of 32 is used for 65 tones, tones 33, 65, and 97 may be associated with the least interpolation error since the vectoring coefficients for these tones are precisely calculated without interpolation and, thus, should have no interpolation error.

When multiple tones are identified as having the least interpolation error in block 412, the control logic 333 may be configured to select any one of such tones in block 412 (e.g., randomly or according to any desired algorithm). For illustrative purposes, assume that the control logic 333 selects tone 33 in block 412.

As shown by block 415, the control logic 333 is configured to pair for encoding the two tones previously selected in blocks 410 and 412. In this regard, the control logic 333 updates or otherwise defines the tone list 244 such that the bit extractor 225 (FIG. 5), based on such tone list 244, appropriately orders the tones to cause the trellis encoder 227 (FIG. 5) to combine the selected tones (i.e., tones 33 and 49 in the current example). Note that the tone list 244 indicates which tones are to be paired and, for each pair, may indicate the tone indices of the paired tones.

Figure 9:
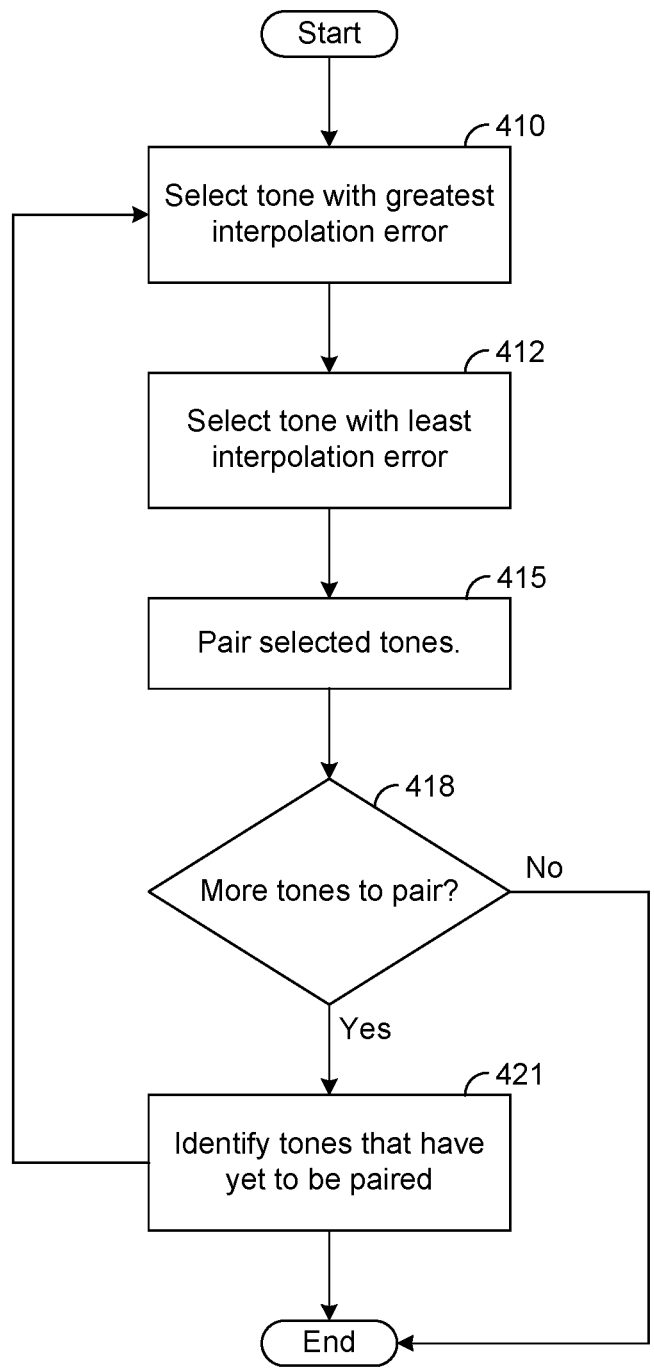
FIG. 9 is a flow chart illustrating an exemplary method for pairing tones for encoding by a trellis encoder.

After selecting a pair of tones for encoding as described above, the control logic 333 may determine whether there are tones that have yet to be paired, as shown by block 418 of FIG. 9. If so, the control logic 333 may repeat the process described above to select another pair of tones for combining by the trellis encoder 227 during encoding. In this regard, the control logic 333 may be configured to identify the tones that have yet to be paired, as shown by block 421. In the current example, only tones 33 and 49 have been paired so far, and the control logic 333 may identify the other tones (i.e., tones 33-48 and 50-96). Of these tones, the control logic 333 selects a tone having the greatest interpolation error and a tone having the least interpolation error in blocks 412 and 412, respectively, and then pairs the two selected tones in block 415. As an example, the control logic 333 might select tone 81 in block 410 and tone 65 in block 412. The control logic 333 continues selecting and pairing tones, as described above, until all possible pairs have been selected at which point the control logic 333 may make a "no" determination in block 418 and the process ends.

Note that once all of the calculated tones have been paired with other tones, the control logic 333 may make a decision in block 412 about which tone(s) are associated with the least amount of interpolation error based on which interpolated tone is the closest (in frequency) to the nearest calculated tone used to interpolate its vectoring coefficient. For example, in the above embodiment for which an interpolation factor of 32 is used for 65 tones, tones 34, 64, 66 and 96 may be associated with the least interpolation error (after the calculated tones 33, 65, and 97 have already been paired) since each such tone is separated (in frequency) from its nearest calculated tone by the smallest amount (which is the same for all of the tones 34, 64, 66, and 96) relative to the other interpolated tones. That is, the separation (in frequency) between tones 33 and 34 is the same as the separation (in frequency) between (1) tones 64 and 65, (2) tones 65 and 66, and (3) tones 96 and 97. Further, such separation is less than the separation (in frequency) between any of the other interpolated tones and their respective nearest calculated tone. Since these tones 34, 64, 66, and 96 are the closest to their respective calculated tones, they may be associated with the least amount of interpolation error once the calculated tones 33, 65, and 97 have been paired.

After pairing of tones 34, 64, 66, and 96, the tones 35, 63, 67, and 95 may then be associated with the least amount of interpolation error in occurrences of block 415. Similarly after pairing of tones 49 and 81, the tones 48, 50, 80, and 82 may then be associated with the greatest amount of interpolation error in occurrences of block 412. Thus, as the process shown by FIG. 9 progresses, tones are paired such that the peak interpolation error associated with each paired set of tones is about the same or similar so that no pair has an excessive amount of interpolation error relative to the other pairs. By keeping the peak interpolation error relatively low across the paired tones, it is possible to have a greater interpolation factor while still achieving a desired signal quality across all tones.

An exemplary method for communicating a frame of data will be described in more detail below.

In this regard, initially, the control logic 363 at the SU transceiver 151 is configured to transmit to the CP transceiver 161 control data indicative of the interpolation pattern used by the vector engine 169 via an embedded control channel or otherwise. As an example, assume that the downstream DMT signal communicated from the SU transceiver 151 to the CP transceiver 161 includes 65 tones from tone 33 to tone 97, as described above, where tones 33, 65 and 97 are precisely calculated based on error feedback from the CP transceiver 161. In such example, the control logic 363 may transmit control data identifying tones 33, 65 and 97 to the CP transceiver 161. Based on the interpolation pattern indicated by the control data, the control logic 333 of the CP transceiver 161 may be configured to define the tone list 244 such that tones are paired according to the process depicted by FIG. 9. Thus, the tone list 244 is defined such that tones associated with a relatively large amount of interpolation error for vectoring are paired with tones associated with a relatively small amount of interpolation error for vectoring, as described above. After defining the tone list 244, the control logic 333 may transmit the tone list 244 to the SU transceiver 151 via an embedded control channel or otherwise.

Figure 10:
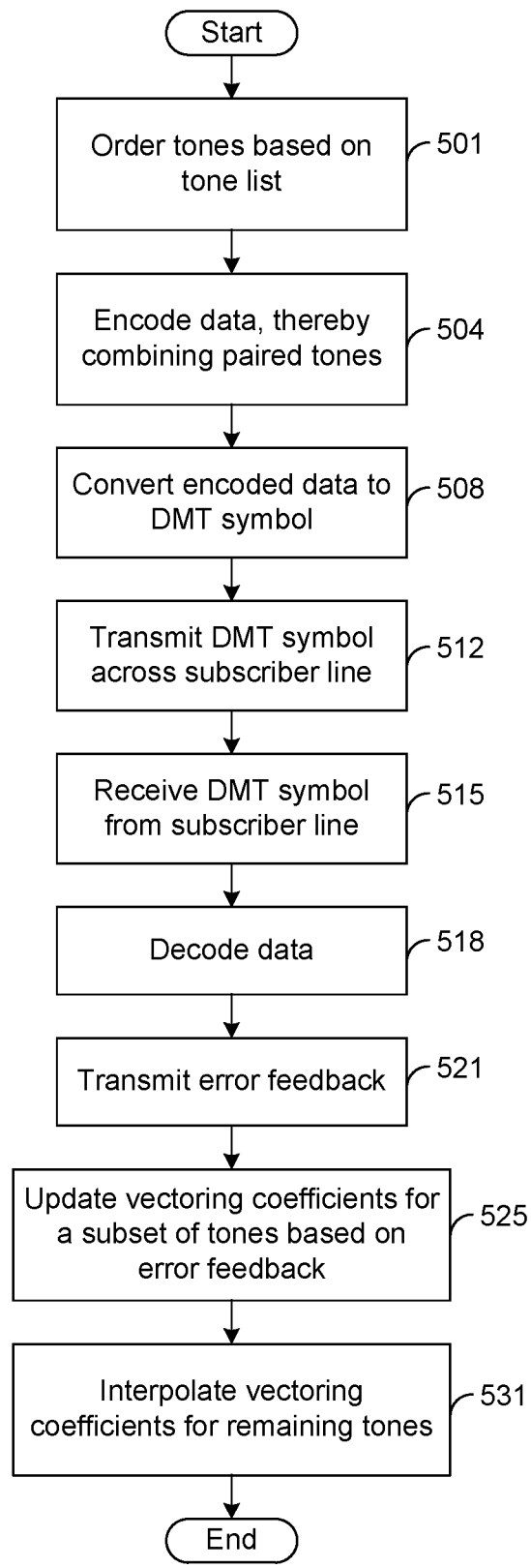
FIG. 10 is a flow chart illustrating an exemplary method for communicating DMT signals and calculating vectoring coefficients based on the DMT signals.

Thereafter, when the bit extractor 225 (FIG. 5) is extracting bits from a frame to be communicated to the CP transceiver 161, the bit extractor 225 orders the tones based on the tone list 244, as shown by block 501 of FIG. 10, such that the trellis encoder 227, during encoding, combines tones that have been selected for pairing by the control logic 333 of the CP transceiver 161, as shown by block 504 of FIG. 10. As an example, for a given tone pair, the bit extractor 225 may extract from the data frame buffer 222 a first group of bits for one of the tones of the pair and extract from the data frame buffer 222 a second group of bits for the other tone of the pair.

The bit extractor 225 may simultaneously feed the first and second groups of bits to the trellis encoder 227 such that the trellis encoder 227 combines the first and second groups of bits to form a combined group of encoded bits. At least one bit of this combined group of encoded bits defines parity information that may be used to correct errors that occur during transmission. The combined group of encoded bits is then output to the constellation mapper 229 for mapping. Note that the trellis encoder 227 performs this same process for each pair of tones of the DMT signal.

The constellation mapper 229 maps each combined group of encoded bits to a constellation. The IFFT parallel-to-serial converter 233 converts the output of the mapper 229 into a serial format and performs an inverse FFT process to provide a DMT symbol, which is transmitted from the SU transceiver 151 to the CP transceiver 161 via the subscriber line 131, as shown by blocks 508 and 512 of FIG. 10. Notably, the DMT symbol propagates along the subscriber line 131 while symbols simultaneously propagate along the subscriber lines 132 and 133, and a portion of the energy from these symbols communicated across the subscriber lines 132 and 133 couples into the subscriber line 131, thereby inducing crosstalk in the DMT symbol transmitted by the SU transceiver 151.

The DMT symbol transmitted in block 512 by the SU transceiver 151 is received by the CP transceiver 161, as shown by block 515 of FIG. 10, and the CP transceiver 161 demodulates the DMT signal and processes the demodulated data to recover the data encoded by the trellis encoder 227. This encoded data is decoded by the trellis decoder 325, thereby recovering the data originally extracted from the data frame buffer 222 of the SU transceiver 161, as shown by block 518. In decoding the encoded data, the trellis decoder 325 may use the parity information in the encoded data to detect and correct at least some transmission errors. The trellis decoder 325 also provides error feedback indicating the amount of error that the decoder 325 detected for each tone, and the control logic 333 at the CP transceiver 161 is configured to transmit control data indicative of at least a portion of such error feedback to the SU transceiver 151 via an embedded control channel of the subscriber line 131 or otherwise, as shown by block 521 of FIG. 10. Note that it is unnecessary for the control data to indicate the error detected for the interpolated tones since the vectoring coefficients for these tones will be interpolated, as will be described in more detail below. In the instant example, the control data may indicate the error detected by the decoder 325 for the tones 33, 65, and 97.

Upon receiving the control data indicative of the error feedback, the control logic 363 at the SU transceiver 151 is configured to transmit such control data to the vector engine 169, which uses the control data to update or otherwise define the vectoring coefficients for the calculated tones, as shown by block 525 of FIG. 10. In the instant example, the vector engine 169 may precisely calculate values for the vectoring coefficients for tones 33, 65, and 97. The vector engine 169 may then use the calculated vectoring coefficients for the calculated tones (i.e., tones 33, 65, and 97 in the instant example) to interpolate the vectoring coefficients for the other tones (i.e., tones 34-64 and 66-96), as shown by block 531 of FIG. 10.

Note that the other SU transceivers 152 and 153 and the other CP transceivers 162 and 163 may be configured similar or identical to the CP transceiver 151 and CP transceiver 161, respectively, and similar techniques may be used to communicate data, define tone pairs, update vectoring coefficients, and perform other functions described above for the transceivers 151 and 161. In addition, the transmitters and receivers used to communicate upstream may be configured similar or identical to the transmitters and receivers used to communicate downstream, and similar techniques may be used in the upstream direction to mitigate for the effects of interpolation error. In some cases, such as for upstream transmission as described above, the vector engine 169 may reside at the receiver such that it is unnecessary for data indicative of the interpolation pattern to be communicated across the subscriber line.

Various embodiments have been described above in which SU transceivers 151-153 and CP transceivers 161-163 communicate across a plurality of subscriber lines. The techniques described herein for mitigating for interpolation error may be used for other types of transceivers as may be desired. As an example, the same techniques may be used by SU transceivers that communicate across communication lines that couple one group of SU transceivers to another, such as communication lines between two distribution points. In addition, other design changes and modifications to the exemplary embodiments described above would be apparent to a person of ordinary skill upon reading this disclosure.

Now, therefore, the following is claimed:

1. A discrete multi-tone (DMT) system for mitigating interpolation errors from crosstalk vectoring, comprising:
   memory for storing a tone list;
   a DMT transmitter having a data frame buffer, a bit extractor, and a trellis encoder, the data frame buffer for storing data for tones of a DMT signal transmitted by the DMT transmitter, the bit extractor configured to extract the data from the frame buffer based on the tone list and to provide the data to the trellis encoder in an order indicated by the tone list; and
   at least one processor programmed with control logic, the control logic configured to receive interpolation data indicative of an interpolation pattern for vectoring coefficients for use by a vector engine in performing crosstalk vectoring for cancelling crosstalk affecting the tones of the DMT signal, the control logic further configured to define the tone list and to determine the order based on the interpolation pattern indicated by the interpolation data.

2. The DMT system of claim 1, wherein the control logic is configured to determine the order such that one of the tones associated with a greatest amount of interpolation error for crosstalk vectoring is paired for encoding by the trellis encoder with one of the tones associated with a least amount of interpolation error for crosstalk vectoring.

3. The DMT system of claim 1, further comprising at least one processor programmed with the vector engine, the vector engine configured to perform the crosstalk vectoring based on the vectoring coefficients, wherein the vector engine is configured to calculate a first plurality of the vectoring coefficients based on error feedback from a trellis decoder and to interpolate a second plurality of the vectoring coefficients based on the calculated first plurality of the vectoring coefficients.

4. A discrete multi-tone (DMT) system for mitigating interpolation errors from crosstalk vectoring, comprising:
   memory for storing control data;
   a DMT transmitter having a data frame buffer, a bit extractor, and a trellis encoder, the data frame buffer for storing data for a plurality of tones of a DMT signal transmitted by the DMT transmitter, the bit extractor configured to extract from the data frame buffer first data for a first tone of the plurality of tones and second data for a second tone of the plurality of tones, the bit extractor configured to transmit the first data and the second data to the trellis encoder based on the control data such that the trellis encoder combines the first data with the second data to form encoded data within the trellis encoder, wherein the DMT transmitter is configured to transmit the encoded data via the DMT signal across a communication line coupled to the DMT transmitter; and
   at least one processor programmed with control logic, the control logic configured to receive interpolation data indicative of an interpolation pattern for vectoring coefficients for use by a vector engine in performing crosstalk vectoring for cancelling crosstalk affecting the plurality of tones of the DMT signal, wherein the control logic is configured to define the control data based on the interpolation pattern.

5. The DMT system of claim 4, wherein the control logic is configured to select the first tone for pairing with the second tone by the trellis encoder based on the interpolation data and to define the control data based on selection of the first tone and the second tone for pairing by the trellis encoder.

6. The DMT system of claim 4, wherein the control data defines a tone list indicative of an order for transmitting the data for the plurality of tones to the trellis encoder.

7. The DMT system of claim 4, further comprising at least one processor programmed with the vector engine, the vector engine configured to perform the crosstalk vectoring based on the vectoring coefficients, wherein the vector engine is configured to calculate a first plurality of the vectoring coefficients based on error feedback from a trellis decoder and to interpolate a second plurality of the vectoring coefficients based on the calculated first plurality of the vectoring coefficients.

8. A method for mitigating for interpolation error in a vectored discrete multi-tone (DMT) system, comprising:
   encoding data with a trellis encoder of a DMT transmitter thereby forming encoded data;
   converting the encoded data to a DMT signal having a plurality of tones with the DMT transmitter;
   transmitting the DMT signal from the DMT transmitter across a communication line coupled to the DMT transmitter;
   storing a plurality of vectoring coefficients in memory, the vectoring coefficients corresponding to the plurality of tones of the DMT signal;
   performing crosstalk vectoring on the plurality of tones of the DMT signal based on the vectoring coefficients, thereby compensating the plurality of tones for crosstalk;
   receiving error feedback from a trellis decoder, the error feedback indicative of errors in the DMT signal detected by the trellis decoder;
   calculating a first plurality of the vectoring coefficients based on the error feedback;
   interpolating a second plurality of the vectoring coefficients based on the calculated first plurality of the vectoring coefficients;
   receiving interpolation data indicative of an interpolation pattern for the interpolating; and
   controlling the encoding based on the interpolation data.

9. The method of claim 8, wherein the controlling comprises controlling which of the plurality of tones are paired by the trellis encoder based on the interpolation data.

10. The method of claim 9, further comprising:
    defining a tone list based on the interpolation data, wherein the controlling comprises transmitting a first group of bits for a first tone of the plurality of tones to the trellis encoder and a second group of bits for a second tone of the plurality to tones based on the tone list such that the trellis encoder pairs the first tone and the second tone, wherein the method further comprises:
    combining the first group of bits with the second group of bits in the trellis encoder to form an encoded group of bits in the trellis encoder, the encoded group of bits having parity information based on the first group of bits and the second group of bits.

11. The method of claim 9, wherein the controlling which of the plurality of tones are paired by the trellis encoder is performed such that one of the plurality of tones associated with a greatest amount of interpolation error for crosstalk vectoring is paired by the trellis encoder with one of the plurality of tones associated with a least amount of interpolation error for crosstalk vectoring.

12. The method of claim 8, further comprising:

defining a tone list based on the interpolation data, the tone list defining an order that data for the plurality of tones is to be provided to the trellis encoder, wherein the controlling comprises controlling an order that the data for the plurality of tones is provided to the trellis encoder based on the tone list, thereby controlling which of the plurality of tones are paired by the trellis encoder.

13. The method of claim 12, further comprising:

receiving the DMT signal from the communication line at a transceiver having the trellis decoder, wherein the defining the tone list is performed at the transceiver; and transmitting the tone list from the transceiver across the communication line.

* * * * *